US012576604B2

(12) United States Patent
Van Beek et al.

(10) Patent No.: US 12,576,604 B2
(45) Date of Patent: Mar. 17, 2026

(54) GRIPPER AND METHOD FOR GRIPPING A TIRE BEAD RING

(71) Applicant: VMI Holland B.V., Epe (NL)

(72) Inventors: Willem Marinus Van Beek, Epe (NL); Timen Anton Van Werven, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/858,095

(22) PCT Filed: Apr. 12, 2023

(86) PCT No.: PCT/NL2023/050191
§ 371 (c)(1),
(2) Date: Oct. 18, 2024

(87) PCT Pub. No.: WO2023/224469
PCT Pub. Date: Nov. 23, 2023

(65) Prior Publication Data
US 2025/0262829 A1     Aug. 21, 2025

(30) Foreign Application Priority Data
May 18, 2022    (NL) ...................................... 2031913

(51) Int. Cl.
B29D 30/00 (2006.01)
(52) U.S. Cl.
CPC .. B29D 30/0016 (2013.01); *B29D 2030/0044* (2013.01)
(58) Field of Classification Search
CPC ................ B29D 30/0016; B29D 30/32; B29D 2030/0044; B29D 2030/3207; B25J 15/0028; B25J 15/08
(Continued)

(56) References Cited

U.S. PATENT DOCUMENTS 2,917,087 A * 12/1959 Wyman .................. B29D 30/48
140/92.2
5,354,404 A    10/1994 Benjamin
(Continued)

FOREIGN PATENT DOCUMENTS

CN        216506865 U      5/2022
EP          2794247        7/2016
(Continued)

OTHER PUBLICATIONS

Search Report issued in the Netherlands, Patent Appln. Serial No. 2031913, dated May 18, 2022, 3 pages.
(Continued)

*Primary Examiner* — Sedef E Paquette
(74) *Attorney, Agent, or Firm* — HAYES SOLOWAY P.C.

(57)        ABSTRACT

Disclosed a gripper for gripping a tire bead ring to be transferred from a pick-up position to a placement position. The gripper includes two or more engagement jaws that are arranged at equal angular distance in a circumferential direction on the gripper, wherein each of the two or more engagement jaws is provided with an engaging finger for engaging the tire bead ring to be gripped, wherein the engagement jaws are configured to radially move between a remote position, in which the engaging fingers are remote from the tire bead ring to be gripped, and an engaging position, in which the engaging fingers engage the tire bead ring to be gripped, wherein the gripper is provided with an ejecting finger configured for ejecting a tire bead ring gripped by the gripper from the gripper.

24 Claims, 5 Drawing Sheets

(58) Field of Classification Search
USPC ................................................ 156/398, 403
See application file for complete search history.

(56) References Cited

U.S. PATENT DOCUMENTS

| | | |
|---|---|---|
| 9,296,166 B2 | 3/2016 | Takagi |
| 10,137,654 B2 | 11/2018 | Slot et al. |
| 11,633,929 B2 | 4/2023 | Bijl et al. |
| 2010/0043947 A1 | 2/2010 | Janszen et al. |
| 2015/0014121 A1 | 1/2015 | Slot et al. |

FOREIGN PATENT DOCUMENTS

| | | |
|---|---|---|
| JP | H05301302 | 11/1993 |
| WO | 2010021546 | 2/2010 |

OTHER PUBLICATIONS

International Preliminary Report on Patentability issued in PCT/NL2023/050191, dated Nov. 7, 2024, 6 page.
International Search Report and Written Opinion issued in PCT/NL2023/050191, dated Jun. 12, 2023, 9 pages.

* cited by examiner

GRIPPER AND METHOD FOR GRIPPING A TIRE BEAD RING

BACKGROUND

The invention relates to a gripper for gripping a tire bead ring to be transferred from a pick-up position to a placement position. Furthermore, the invention relates to a method for gripping a tire bead ring to be transferred from a pick-up position to a placement position, and to a bead transfer device for transferring a tire bead ring from a pick-up position to a placement position.

Such a gripper, for example, is known from the international patent publication WO 2010/021546, which describes a device for transferring and placing tire beads, which device among others is provided with a bead retaining means for picking up and retaining a bead, wherein the bead retaining means is provided with engagement jaws that are arranged at equal angular distance in a circumferential direction on the bead retaining means, wherein the engagement jaws can be driven or withdrawn in radial direction for engaging or releasing, respectively, a tire bead.

SUMMARY OF THE INVENTION

The known gripper among others is used for retrieving a tire bead ring from a tire bead-apex assembly drum and for placing the retrieved tire bead ring onto a next position, such as a pile of tire bead rings. The tire bead ring is picked up by outwardly driving the engagement jaws in the radial direction, so that the tire bead ring is engaged by the engagement jaws, and is placed onto the tire bead-apex assembly drum by inwardly driving the engagement jaws in the radial direction to release the tire bead ring from the gripper. All engagement jaws are driven simultaneously, such that the engagement jaws move simultaneously. It is important that placement onto the next position is executed centered and evenly. In order to obtain a good adhesion of the tire bead ring to the apex, the tire bead ring is provided with a thin layer of unvulcanized rubber. Because of the thin layer of unvulcanized rubber, the tire bead ring may remain stuck to one of the engagement jaws when the engagement jaws are moved inwardly. This is disadvantageous, as this results in the tire bead ring being not simultaneously released from all engagement jaws because of which placement of the tire bead ring onto the tire bead-apex assembly drum is not performed centered. Additionally, the tire bead ring may disadvantageously deform to a non-circular shape due to remaining stuck to one of the engagement jaws.

It is an object of the present invention to ameliorate or to eliminate one or more disadvantages of the known prior art, to provide an improved gripper or to at least provide an alternative gripper.

According to a first aspect, the invention provides a gripper for gripping a tire bead ring to be transferred from a pick-up position to a placement position, the gripper comprising:

two or more engagement jaws that are arranged at equal angular distance in a circumferential direction on the gripper, wherein each of the two or more engagement jaws is provided with an engaging finger for engaging the tire bead ring to be gripped, wherein the engagement jaws are configured to radially move between a remote position, in which the engaging fingers are remote from the tire bead ring to be gripped, and an engaging position, in which the engaging fingers engage the tire bead ring to be gripped, wherein the gripper is provided with an ejecting finger configured for ejecting a tire bead ring gripped by the gripper from the gripper.

During use of the gripper according to the invention, the engaging fingers are moved from the remote position, such as a radially inward position, to the engaging position, such as a radially outward position, in order to engage and thus to grip a tire bead ring. When the gripper is near to or at the placement position, the engaging fingers are moved radially inwards to release the gripper tire bead ring from the gripper. Prior to or during moving the engaging fingers radially inwards to release the gripped tire bead ring, the ejecting fingers will apply an ejecting force onto the tire bead ring. The ejecting force applied by the ejecting fingers prevents the tire bead ring from remaining stuck to one or more of the engagement fingers, when the engagement fingers are moving radially inward. This is advantageous, since the tire bead ring is released from all engaging fingers simultaneously such that placement of the tire bead ring is performed centered and evenly.

In an embodiment, the ejecting finger is configured for ejecting a tire bead ring gripped by the gripper from the gripper in an ejection direction that is directed transverse to the movement direction and away from the gripper. For example, when the gripper has a horizontal orientation so that the engagement jaws move in a horizontal direction, the ejecting fingers are configured for ejecting a gripper tire bead ring in a vertical direction that is directed downwards.

In an embodiment, the gripper comprises two or more ejecting fingers, wherein each of the two or more engagement jaws comprises an ejecting finger. By arranging the ejecting fingers at the engagement jaws, the ejecting fingers advantageously act onto a gripped tire bead ring at a location that is nearest to where the tire bead ring may remain stuck.

In an embodiment, the ejecting finger is configured to be moved between an idle position, in which the ejecting finger is spaced from the tire bead ring, an ejecting position, in which the ejecting finger abuts against the tire bead ring, thereby applying an ejecting force onto the tire bead ring, and an ejected position in which the ejecting finger is at least partially positioned at the location where the tire bead ring was located. In an embodiment thereof, the ejecting finger is configured to move into the ejecting position when the associated engaging finger is in the engaging position. According to this embodiment, the ejecting finger is moved into the ejecting position prior to moving the associated engaging finger out of the engaging position and towards the remote position. In the ejecting position, the ejecting finger is placed against the tire bead ring such that an ejecting force is applied on the tire bead ring. As a result of the ejection force, friction is present in radial direction between the ejecting finger and the tire bead ring. The inventors have surprisingly found that the ejecting force and the radial friction associated therewith applied onto the tire bead ring is sufficient for preventing the tire bead ring from remaining stuck to the engaging fingers. The gripper according to this embodiment, therefore, is enabled to simultaneously release the tire bead ring from all engagement jaws.

In an alternative embodiment, the ejecting finger is configured to move into the ejecting position when movement of the associated engaging finger from the engaging position into the remote position is initiated.

In an embodiment, the engaging finger is configured to be moved from the remote position to the engaging position at a first speed, and from the engaging position to the remote position at a second speed, wherein the second speed is higher than the first speed.

In an embodiment, each engagement jaw comprises a separating finger configured for separating a tire bead ring to be gripped from a surface onto which the tire bead ring is located, and for moving between the remote position and the engaging position. In an embodiment thereof, each separating finger is provided with a tapered tip arranged at such manner, that the tapered tip radially extends beyond the associated engaging finger when the separating finger and the associated engaging finger are at the engaging position. The separating finger with the tapered tip advantageously allows the gripper, for example, to prevent a tire bead ring to be gripped from slipping off the engaging fingers during moving the tire bead ring away from the surface onto which it was located.

In an embodiment, the engaging finger and the separating finger of each engagement jaw are operatively connected to each other, such that movement of the separating finger from the remote position to the engaging position results in movement of the engaging finger from the remote position to the engaging position, and such that the separating finger is enabled to move away from the engaging position towards the remote position independently from the engaging finger. Preferably, the gripper comprises a drive configured for moving one or more of the engagement jaws between the remote position and the engaging position. In an embodiment thereof, the drive is operatively connected to the respective separating finger(s) of the one or more of the engagement jaws. An advantage of this embodiment is that, at least per engagement jaw or perhaps per gripper, a single drive is sufficient for moving the engaging finger and the separating finger from the remote position to the engaging position.

In a further embodiment, the engaging finger of each engagement jaw includes a brake that is moveable between an idle position, in which the engaging finger is enabled to move between the remote position and the engaging position, and a braking position, in which the engaging finger is prevented from moving between the remote position and the engaging position. In a further embodiment, a spring is operatively connected to and provided between the engaging finger and the separating finger of each engagement jaw. According to this embodiment, the engaging finger may be maintained in the engaging position while the associated separating finger is already moved towards the remote position, such that the tapered tip is moved out of the way before releasing the tire bead ring. Subsequently, when the brake of each of the engaging fingers is moved from the brake position into the idle position, each engaging finger is pulled relatively fast to the associated separating finger by means of the spring provided therebetween.

In an embodiment, the ejecting finger of each engagement jaw is arranged at the separating finger such that the ejecting finger extends in a direction parallel to the movement direction. In an embodiment thereof, the ejecting finger is arranged at the separating finger rotatable about a rotation axis that is transverse to the movement direction. According to this embodiment, the ejecting fingers work like a flipper. This is advantageous, as the height required for incorporating the ejecting fingers into the gripper is kept to a minimum.

According to a second aspect, the invention provides a method for gripping a tire bead ring to be transferred from a pick-up position to a placement position by means of a gripper according to the first aspect of the invention, wherein the method comprises the steps of:

moving the gripper towards the pick-up position, while the engaging fingers are in the remote position;

radially moving the engaging fingers into the engaging position, thereby engaging the tire bead ring;

moving the gripper towards placement position; and releasing the gripped tire bead ring by moving the engaging fingers towards the remote position, wherein the method further comprises the step of ejecting the tire bead ring from the gripper by means of the ejecting finger of each engagement jaw.

In an embodiment, wherein the ejecting finger is configured to be moved between an idle position, in which the ejecting finger is spaced from the tire bead ring, an ejecting position, in which the ejecting finger abuts against the tire bead ring, thereby applying an ejecting force onto the tire bead ring, and, after ejection of the tire bead ring, an ejected position in which the ejecting finger is at least partially positioned at the location where the tire bead ring was located, the step of ejecting the tire bead ring comprises moving the ejecting finger from the idle position to the ejecting position and allowing the ejecting finger to move into the ejected position. In an embodiment thereof, the step of moving the ejecting finger from the idle position to the ejection position is performed prior to the step of releasing the gripped tire bead ring.

In an alternative embodiment, the step of moving the ejecting finger from the idle position to the ejection position is performed simultaneously with the step of releasing the gripped tire bead ring.

In an embodiment, when the gripper is a gripper wherein the engaging finger of each engagement jaw includes a brake that is moveable between an idle position, in which the engaging finger is enabled to move between the remote position and the engaging position, and a braking position, in which the engaging finger is prevented from moving between the remote position and the engaging position, the step of moving the engaging fingers into the engaging position comprises, for each engagement jaw, moving the separating finger into the engaging position, thereby moving the associated engaging finger into the engaging position, and moving the brake into the braking position when the separating finger and the associated engaging finger are in the engaging position.

In an embodiment, the method further comprises, for each engagement jaw, moving the separating finger out of the engaging position towards the remote position when the brake of the associated engaging finger is moved into the braking position.

In an embodiment, wherein the gripper is a gripper wherein a spring is operatively connected to and provided between the engaging finger and the separating finger of each engagement jaw, the step of releasing the gripped tire bead ring by moving the engaging fingers towards the remote position comprises moving the brake into the idle position.

According to a third aspect, the invention provides a bead transfer device for transferring a tire bead ring from a pick-up position to a placement position, the bead transfer device comprising:

a robotic arm and a gripper according to the first aspect of the invention, which gripper is arranged at the robotic arm such that the robotic arm is enabled to move the gripper.

According to a fourth aspect, the invention provides a computer-readable medium having computer-according executable instructions adapted to cause a gripper to a first aspect of the invention to perform a method according to the second aspect of the invention.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
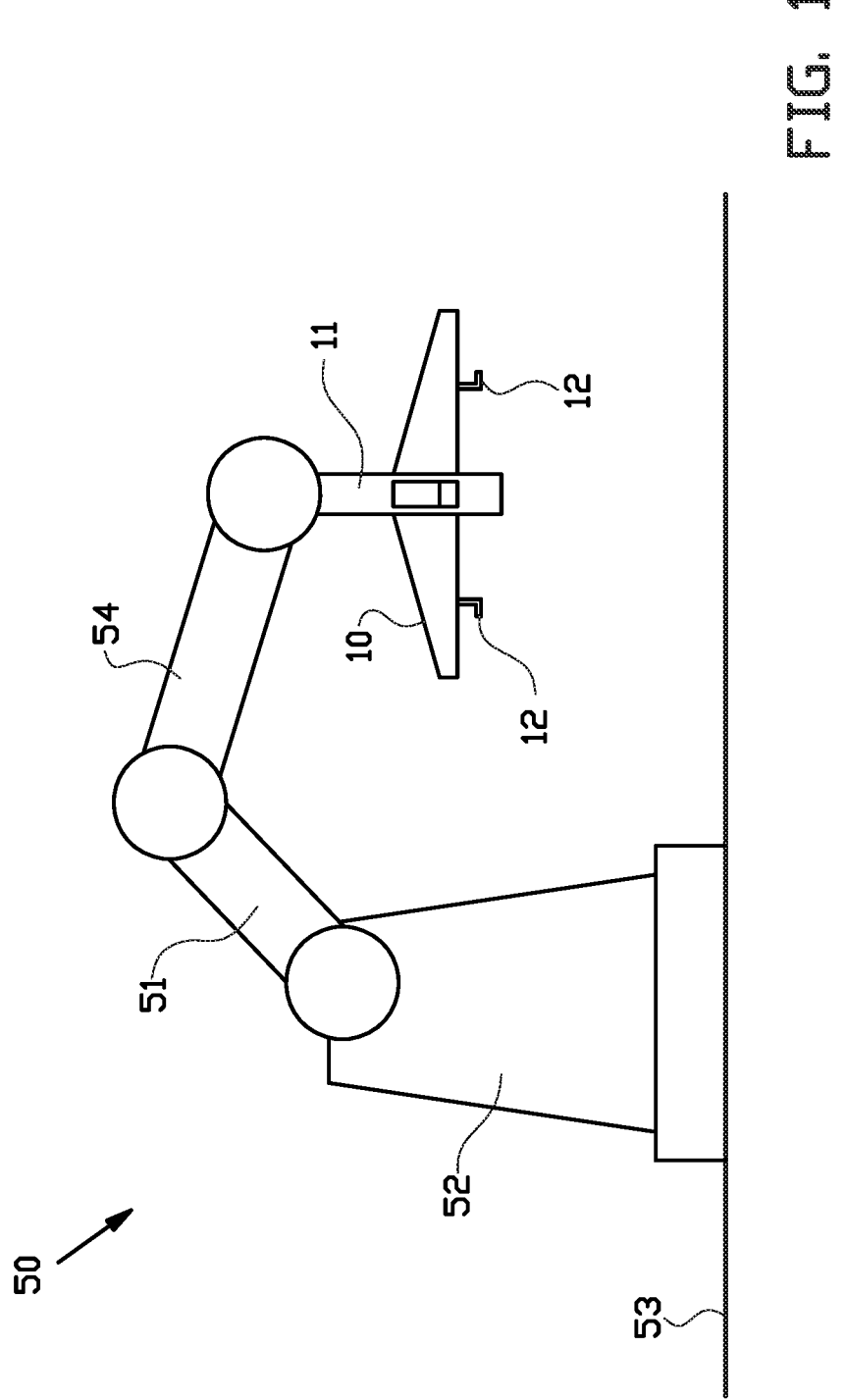
FIG. 1 shows a bead transfer device for transferring a tire bead ring from a pick-up position to a placement position, which bead transfer device comprises a gripper according to an embodiment of the invention.

A bead transfer device 50 configured for transferring a tire bead ring 2 from a pick-up position to a placement position, which bead transfer device 50 comprises a gripper 1 according to an embodiment of the invention is schematically shown in FIG. 1. The bead transfer device 50, for example, may be used for transferring a tire bead ring 2 from a building drum to a bead separator, wherein the tire bead ring 2 may be picked-up vertically from the building drum and may be placed horizontally onto the bead separator.

As shown in FIG. 1, the bead transfer device 50 is provided with a manipulator 51 for engaging and carrying a tire bead ring 2 from the pick-up position to the placement position. The manipulator 51 is supported by a manipulator base 52 that, for example, is fixed relative to a factory floor 53. The manipulator 51 has a robotic arm 54 that is supported by the manipulator base 52, and a gripper 1 arranged at the robotic arm 54, in particular at the end of the robotic arm 54 facing away from the manipulator base 52. The robotic arm 54 typically provides six degrees of freedom to the manipulator 51, thereby enabling the bead transfer device 50 among others to vertically pick-up a tire bead ring 2 and to horizontally place the tire bead ring 2, or vice versa.

Figure 2:
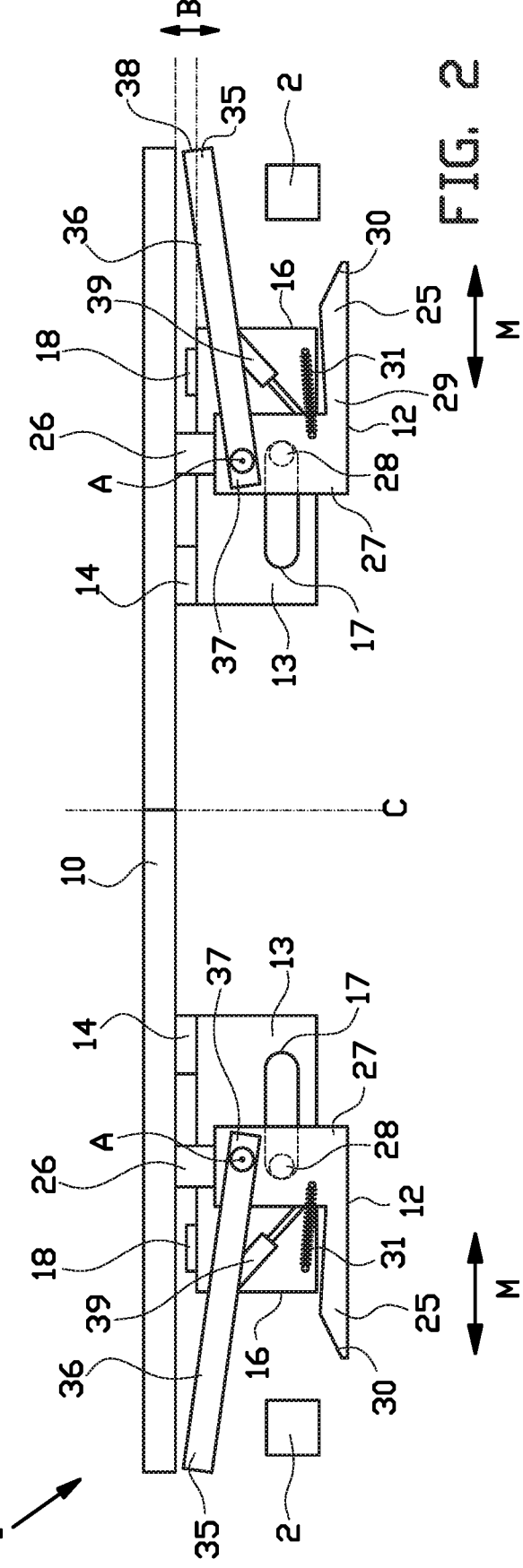
FIG. 2 shows an enlarged side view of the gripper of FIG. 1.

A detailed side view of the gripper 1 is shown in FIG. 2. The gripper 1 has a gripper frame 10 with a gripper connector 11 for connecting the gripper 1 to the robotic arm 54. The gripper connector 11 extends substantially transverse or transverse to the gripper frame 10 and defines center axis C extending through the gripper connector 11 and transverse to the gripper frame 10. The gripper frame 10, for example, may be formed by means of four not shown arms that extend radially outwards from the center of the gripper frame 10. Such a configuration of a gripper frame, for example, is shown in international patent publication WO 2010/021546 of the Applicant.

In order to grip a tire bead ring 2 with the gripper 1, the gripper 1 is provided with two or more, in this example four, engagement jaws 12. The engagement jaws 12 are arranged at equal angular distance in a circumferential direction on the gripper 1, such that according to the shown example an angular distance of 90° is present between neighboring engagement jaws 12. Furthermore, the engagement jaws 12 are arranged moveable at the gripper frame 10. The engagement jaws 12 are configured to mainly move radial outwards, seen from and transverse to the center line C and in movement direction M, in order to engage the tire bead ring 2, and to move radial inwards in order to release the tire bead ring 2 from the gripper 1.

In an alternative not shown embodiment, the engagement jaws 12 may be configured to mainly move radial inwards, seen from and transverse to the center line C and in movement direction M, in order to engage the tire bead ring 2, and to move radial outwards in order to release the tire bead ring 2 from the gripper 1.

As schematically shown in FIG. 2, each of the engagement jaws 12 comprises an engaging finger 13 for engaging the tire bead ring 2 to be gripped. The engaging finger 13 is arranged moveable to the gripper frame 10 by means of a first connector 14, such that the engaging finger 13 is enabled to move rectilinearly with respect to the gripper frame 10. For example, the engaging finger 13 is connected to a not shown rail guide at the gripper frame 10. The engaging finger 13 further comprises an engaging body 15, connected to the first connector 14, having a radially outward facing engaging surface 16 for engaging the tire bead ring 2 to be gripped by the gripper 1.

Each engaging finger 13 includes a receiving slit 17 having a longitudinal axis parallel to the movement direction M and extending at least partially through the engaging finger 13 in a direction transverse to the movement direction M and to the center line C. As clearly shown in FIG. 2, the length of the receiving slit 17 is smaller than the length of the engaging body 15 in the movement direction M, and preferably the receiving slit 17 is located within the inward directed half of the engaging body 15. Furthermore, each engaging finger 13, at the side facing towards the trigger frame 10, is provided with a brake 18 that is moveable in a braking direction B parallel to the center line C between an idle position, as shown in FIG. 2, and a braking position, in which the brake 18 is in braking contact with the trigger frame 10.

As shown in FIG. 2, each engagement jaw 12 further comprises a separating finger 25 configured for separating a tire bead ring 2 to be gripped, for example, from any further tire bead ring 2 on a stack of tire bead rings 2 or from a surface onto which the tire bead ring 2 is placed. The separating finger 25 is moveably connected to the gripper frame 10 by means of a second connector 26, for example to a not shown rail guide. Additionally, the separating finger 25 is operatively connected to a not shown drive, such as a servo motor or a driving cylinder, which is configured for driving the separating finger 25 in the movement direction M radial outwards or radial inwards. In this exemplary embodiment, the separating finger 25 is arranged next to the engaging finger 13 of the respective engagement jaw 12.

Each separating finger 25 has a connecting portion 27, which in this exemplary embodiment is rectangular shaped when seen from the side. The second connector 26 is arranged at the connecting portion 27, in particular at the side thereof facing towards the gripper frame 10. At the side of the connecting portion 27 facing towards the engaging finger 13, the connecting portion 27 is provided with a connecting pin 28 extending away therefrom and towards the engaging finger 13. The connecting pin 28 is received within the receiving slit 17 of the neighboring engaging finger 13, such that movement of the separating finger 25 results in movement of the engaging finger 13 when the connecting pin 28 abuts against one of the ends of the receiving slit 17.

In an alternative embodiment, each separating finger 25 is provided with the receiving slit 17, and each engaging finger 13 is provided with the connecting pin 28.

Each separating finger 25 further has a separating portion 29 arranged at the connecting portion 27, in particular at the radially outward facing side thereof. The separating portion 29 extends radially outwards from the connecting portion 27 and, at least in the exemplary embodiment, is oblong. At the end of the separating portion 29 facing away from the connecting portion 27, the separating portion 29 has a tapered tip 30 that might be positioned below a tire bead ring 2 to be gripped. The separating fingers 25 intended to separate a tire bead ring 2 to be gripped from a surface onto which the tire bead ring 2 is placed, for example, in the event that the tire bead ring 2 or an apex attached to the tire bead ring 2 remains stuck to the surface.

The length of the separating portion 29 and the length of the receiving slit 17 are chosen such that when the separating finger 25 is in an engaging position, in this exemplary embodiment a radially outward position, i.e. the connecting pin 28 abuts against the radial outward end of the receiving slit 17, as is shown in FIG. 2, the tapered tip 30 extends radially beyond the engaging surface 16, and when the separating finger 25 is in a remote position, in this exemplary embodiment a radially inward position, i.e. the connecting pin 28 abuts against or is near to the radial inward end of the receiving slit 17, the tapered tip 30 is retracted in radial direction such that the tapered tip 30 does not extend radially beyond the engaging surface 16.

A spring 31 is provided between and operatively connected to the separating finger 25 and the engaging finger 13 of each engagement jaw 12.

Furthermore, each of the engagement jaws 12 includes an ejecting finger 35, also called a flipper, that is configured for ejecting a tire bead ring 2 gripped by the gripper 1 from the gripper 1. The ejecting finger 35 is configured for ejecting the tire bead ring 2 in an ejecting direction E transverse to the movement direction M of the engaging finger 13, in particular in a direction parallel to the center axis C. The ejecting finger 35 has an elongated ejecting body 36 with a first end 37 and a second end 38, opposite to the first end 37 when seen in longitudinal direction of the ejecting body 36. At the first end 37 thereof, the ejecting body 36 is rotatably connected to the separating finger 25, in particular the connecting portion 27 thereof, at or near the side facing towards the gripper frame 1, wherein the ejecting finger 35 is rotatable around a rotation axis A. Movement of the separating finger 25, thus, results in movement of the ejecting finger 35. The second end 38 of the ejecting finger 35 is configured for being in proximity of and/or being in contact with the tire bead ring 2, while ejecting the tire bead ring 2 from the gripper 1. The length of the ejecting body 36 is chosen such that the second end 38 of the ejecting body 36 extends radially beyond the engaging surface 16, regardless of the position of the separating finger 25 with respect to the engaging finger 13.

As best shown in FIG. 2, a rotating piston 39, such as a hydraulic or pneumatic piston, is provided between and operatively connected to the ejecting finger 35 and to the separating finger 25, in particular the connecting portion 27 of the separating finger 25. The rotating piston 39 is configured for rotating the ejecting finger 35 around the rotation axis A in order to move the ejecting finger 35 from an idle position, as shown in FIG. 2, to an ejecting position, as shown in FIG. 3D. When the ejecting finger 35 is in the ejecting position, the ejecting finger 35 abuts against the tire bead ring 2 and applies an ejecting force to the tire bead ring 2, which ejecting force is directed substantially parallel to the center line C.

In an alternative embodiment, the ejecting finger 35 may be formed as an ejecting piston or as an ejecting pusher.

Figures 3A, 3B:
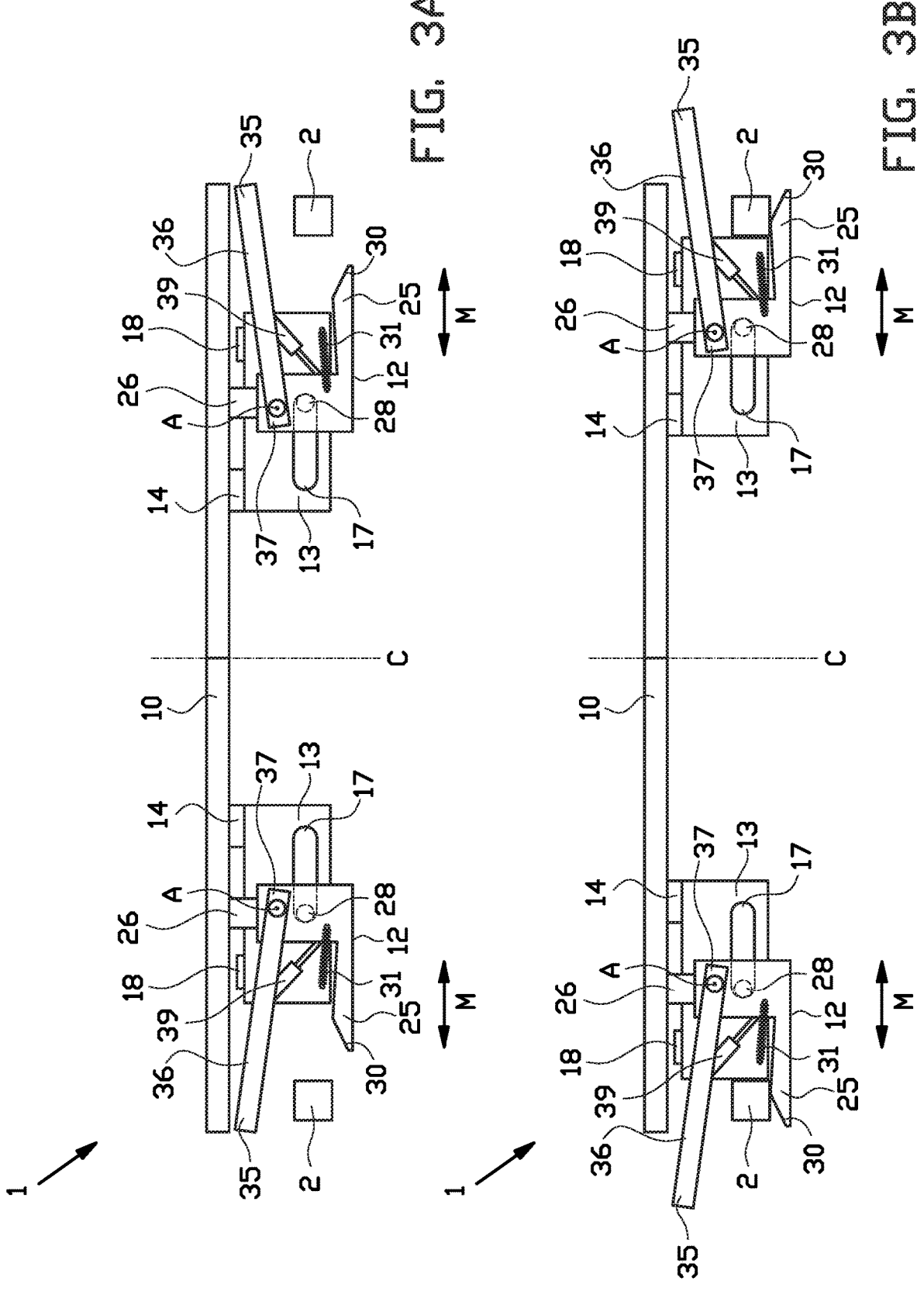
FIGS. 3A-3E show the steps of picking-up and placing a tire bead ring by means of the gripper of FIG. 2.
Figures 3C, 3D:
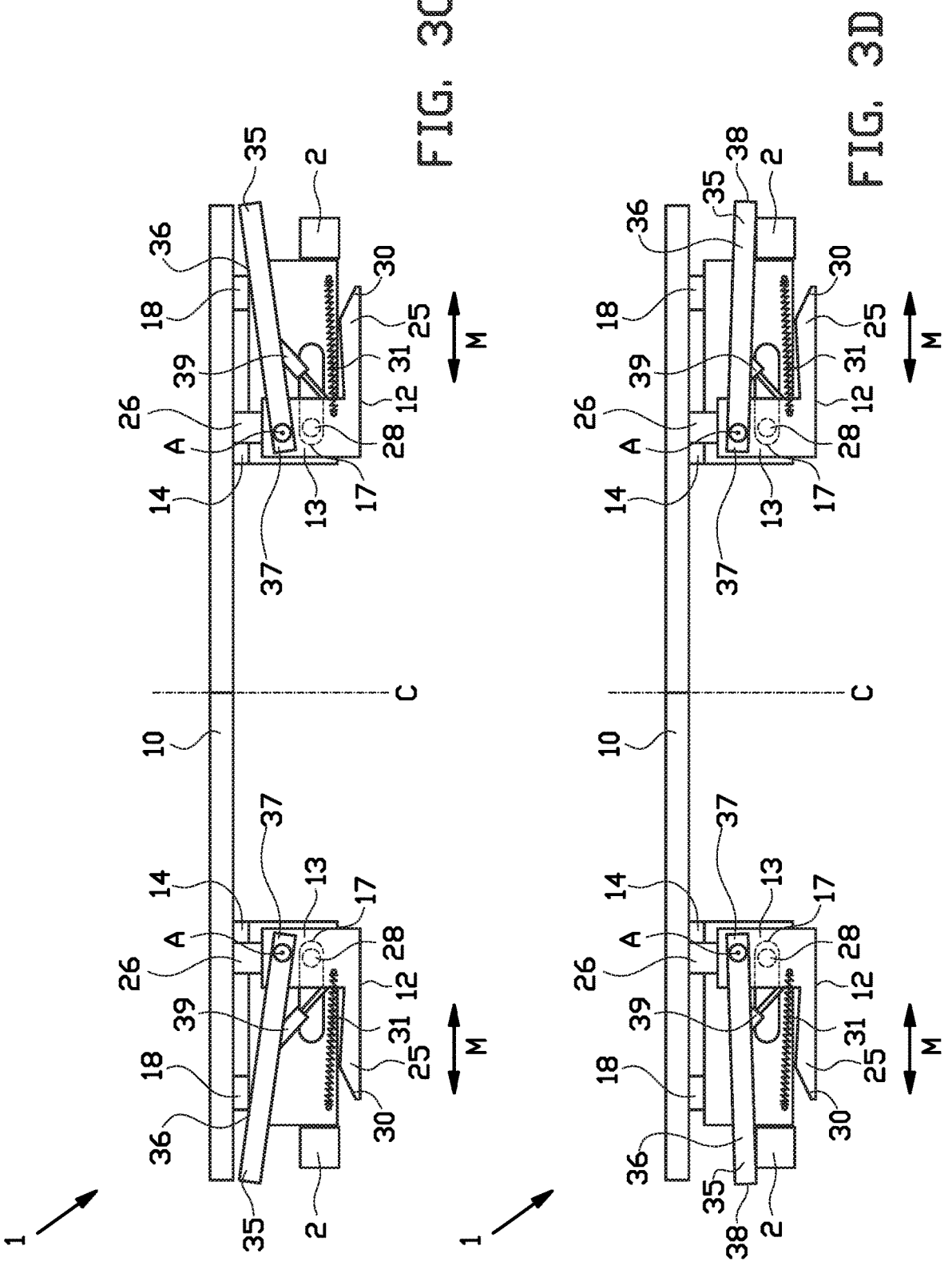
Figure 3E:
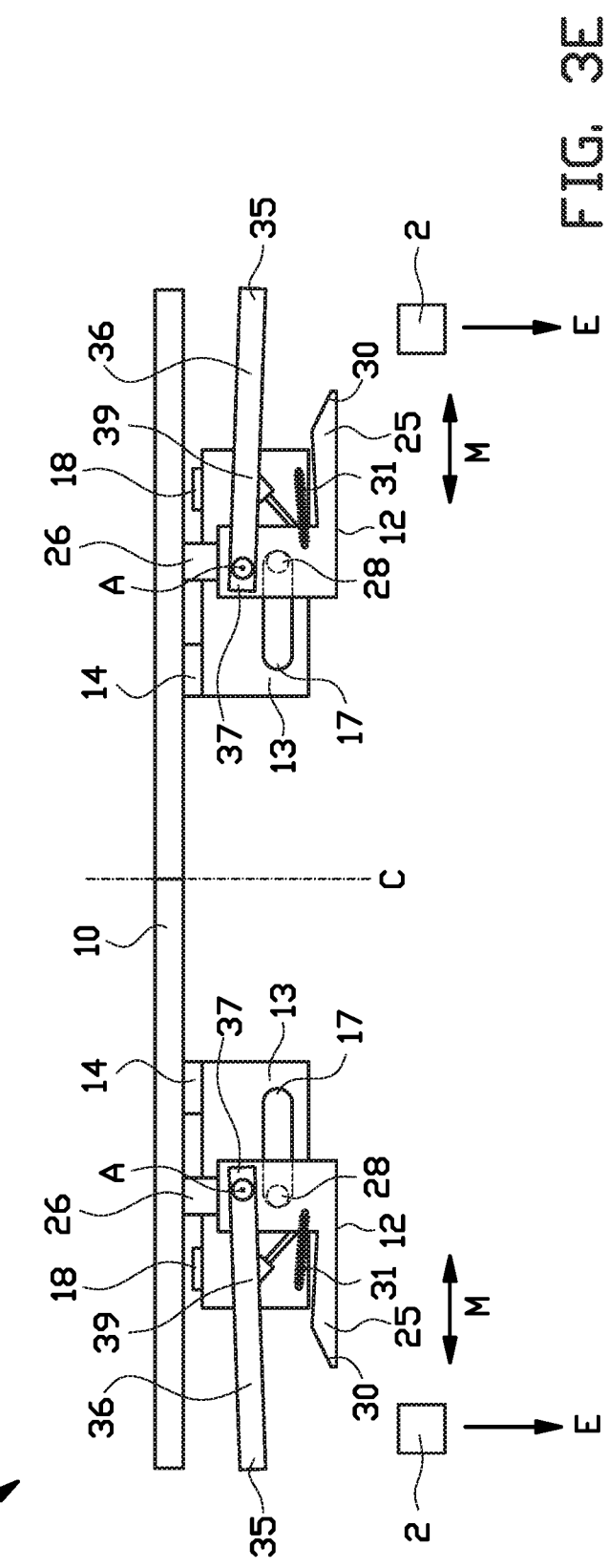

The steps of picking-up and placing a tire bead ring 2 by means of the gripper 1 as shown in FIG. 2 are schematically shown in FIGS. 3A-3E. When the gripper 1 is required to grip a tire bead ring 2, the gripper 1 is moved to a pick-up position in which the engagement jaws 12 are located within the tire bead ring 2, as shown in FIG. 3A. During this step, the engagement jaws 12 are located at the radially inward position, as shown in FIG. 3A, in which radially inward position the engagement jaws 12 are spaced from the tire bead ring 2.

Subsequently, the engagement jaws 12, in particular the separating fingers 25 thereof are moved to the radially outward position, preferably at a first speed, as shown in FIG. 3B. In the shown exemplary embodiment, the separating fingers 25 are moved radially outward and the engagement fingers 13 are pulled along because of the connecting pin 28 within the receiving slit 17. When in the radially outward position, the engaging surface 16 of the engaging fingers 13 engages the tire bead ring 2 and, optionally, the engagement jaws 12 are stretching the tire bead ring 12 slightly in order to prevent the tire bead ring 2 from sliding with respect to the engaging surface 16. As soon as the tire bead ring 2 is engaged, and thus gripped, by the engagement jaws 12, the gripper 1 may move the gripper 1 and thereby the tire bead ring 2 to a placement position, at which the tire bead ring 2 may be placed.

It is noted that due to the position of the tapered tip 30 of the separating fingers 25 with respect to the tire bead ring 2 engaged by the engaging fingers 13, the tire bead ring 2 may be separated, for example, from a not shown tire bead ring 2 directly adjacent to the tire bead ring 2.

During the steps indicated in FIGS. 3A and 3B, the brake 18 is in the idle position thereof.

When the gripper 1 is almost at or is at the placement position, the brakes 18 are moved into the braking position thereof so that the brake 18 is in braking contact with the trigger frame 10, as schematically indicated in FIG. 3C. Subsequently, the separating fingers 25 are moved towards the radially inward position thereof. Because of the brake 18 being into braking contact with the trigger frame 10, the engaging fingers 13 are prevented from moving into the radially inward position thereof and, thus, remain in the radially outward position thereof. Movement of the separating fingers 25 towards the radially inward position is limited by the length of the receiving slit 17. When the separating fingers 25 are moved radially inward the tapered tips 30 of the separating fingers 25 radially no longer extend beyond the engaging surface 16 of the engaging fingers 13, and the springs 31 between the engaging fingers 13 and the separating fingers 25 are tensioned.

As a following step, as indicated in FIG. 3D, the ejecting fingers 35 each are rotated around the rotation axis A thereof into the ejecting position by means of the rotating piston 39. As shown in FIG. 3D, the ejecting fingers 35 abut against the tire bead ring 2 engaged by the engaging fingers 13, thereby applying an ejecting force onto the tire bead ring 2. It is noted that the ejecting force is not sufficient for pushing the tire bead ring 2 off the engaging fingers 13.

When the ejecting fingers 35 are abutting against the tire bead ring 2, the engaging fingers 13 are moved radially inwards, preferably at a second speed higher than the first speed, by moving the brakes 18 from the braking position into the idle position, thereby releasing the braking contact between the engaging fingers 13 and the gripper frame 10. Because of the tensioned springs 31 between the engaging fingers 13 and the separating fingers 25, the engaging fingers 13 are rapidly pulled towards the separating fingers 25 by the springs 31, thereby releasing the tire bead ring 2 from the engagement jaws 12. While the engaging fingers 13 are rapidly pulled towards the separating fingers 25, the ejecting fingers 35 push the tire bead ring 2 away from the gripper frame 10 to eject the tire bead ring 2. Optionally, the ejecting fingers 35 rotate slightly further towards the tapered tips 30 of the separating fingers 25, thereby moving into the ejected position.

Subsequently, the gripper 1, in particular the ejecting fingers 35 thereof, may move back into the pick-up position as schematically indicated in FIG. 3A.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS

1 gripper
2 tire bead ring
10 gripper frame
11 gripper connector
12 engagement jaws
13 engaging finger
14 first connector
15 engaging body
16 engaging surface
17 receiving slit
18 brake
25 separating finger
26 second connector
27 connecting portion
28 connecting pin
29 separating portion
30 tapered tip
31 spring
35 ejecting finger
36 ejecting body
37 first end
38 second end
39 rotating piston
50 bead transfer device
51 manipulator
52 manipulator base
53 factory floor
54 robotic arm
A rotation axis
B braking direction
C center axis
E ejection direction
M movement direction

The invention claimed is:

1. A gripper for gripping a tire bead ring to be transferred from a pick-up position to a placement position, the gripper comprising:

two or more engagement jaws that are arranged at equal angular distance in a circumferential direction on the gripper, wherein each of the two or more engagement jaws is provided with an engaging finger for engaging the tire bead ring to be gripped, wherein the engagement jaws are configured to radially move in a movement direction between a remote position, in which the engaging fingers are remote from the tire bead ring to be gripped, and an engaging position, in which the engaging fingers engage the tire bead ring to be gripped, wherein the gripper comprises a drive configured for moving one or more of the engagement jaws between the remote position and the engaging position, and wherein the gripper is provided with an ejecting finger configured for ejecting the tire bead ring gripped by the gripper from the gripper.

2. The gripper according to claim 1, wherein the ejecting finger is configured for ejecting the tire bead ring gripped by the gripper from the gripper in an ejection direction that is directed transverse to the movement direction and away from the gripper.

3. The gripper according to claim 1, comprising two or more ejecting fingers, wherein each of the two or more engagement jaws comprises an ejecting finger.

4. The gripper according to claim 1, wherein the ejecting finger is configured to be moved between an idle position, in which the ejecting finger is spaced from the tire bead ring, an ejecting position, in which the ejecting finger abuts against the tire bead ring, thereby applying an ejecting force onto the tire bead ring, and an ejected position in which the ejecting finger is at least partially positioned at the location where the tire bead ring was located.

5. The gripper according to claim 4, wherein the ejecting finger is configured to move into the ejecting position when the associated engaging finger is in the engaging position.

6. The gripper according to claim 4, wherein the ejecting finger is configured to move into the ejecting position when movement of the associated engaging finger from the engaging position into the remote position is initiated.

7. The gripper according to claim 1, wherein the engaging finger is configured to be moved from the remote position to the engaging position at a first speed, and from the engaging position to the remote position at a second speed, wherein the second speed is higher than the first speed.

8. The gripper according to claim 1, wherein each engagement jaw comprises a separating finger configured for separating the tire bead ring to be gripped from a surface onto which the tire bead ring is located, and for moving between the remote position and the engaging position.

9. The gripper according to claim 8, wherein each separating finger is provided with a tapered tip arranged at such manner, that the tapered tip radially extends beyond the associated engaging finger when the separating finger and the associated engaging finger are at the engaging position.

10. The gripper according to claim 8, wherein the engaging finger and the separating finger of each engagement jaw are operatively connected to each other, such that movement of the separating finger from the remote position to the engaging position results in movement of the engaging finger from the remote position to the engaging position, and such that the separating finger is enabled to move away from the engaging position towards the remote position independently from the engaging finger.

11. The gripper according to claim 10, comprising a drive configured for moving one or more of the engagement jaws between the remote position and the engaging position, wherein the drive is operatively connected to the respective separating finger(s) of the one or more of the engagement jaws.

12. The gripper according to claim 11, wherein the engaging finger of each engagement jaw includes a brake that is moveable between an idle position, in which the engaging finger is enabled to move between the remote position and the engaging position, and a braking position, in which the engaging finger is prevented from moving between the remote position and the engaging position.

13. The gripper according to claim 12, wherein a spring is operatively connected to and provided between the engaging finger and the separating finger of each engagement jaw.

14. The gripper according to claim 8, wherein the ejecting finger of each engagement jaw is arranged at the separating finger such that the ejecting finger extends in a direction parallel to the movement direction.

15. The gripper according to claim 14, comprising two or more ejecting fingers, wherein each of the two or more engagement jaws comprises an ejecting finger, wherein the ejecting finger is arranged at the separating finger of said engagement jaw rotatable about a rotation axis that is transverse to the movement direction.

16. A method for gripping a tire bead ring to be transferred from a pick-up position to a placement position using a gripper according to claim 1, wherein the method comprises the steps of:

moving the gripper towards the pick-up position, while the engaging fingers are in the remote position; radially moving the engaging fingers into the engaging position, thereby engaging the tire bead ring; moving the gripper towards the placement position; and releasing the gripped tire bead ring by moving the engaging fingers towards the remote position, wherein the method further comprises the step of ejecting the tire bead ring from the gripper by means of using the ejecting finger.

17. The method according to claim 16, wherein the ejecting finger is configured to be moved between an idle position, in which the ejecting finger is spaced from the tire bead ring, an ejecting position, in which the ejecting finger abuts against the tire bead ring, thereby applying an ejecting force onto the tire bead ring, and, after ejection of the tire bead ring, an ejected position in which the ejecting finger is at least partially positioned at the location where the tire bead ring was located, wherein the step of ejecting the tire bead ring comprises moving the ejecting finger from the idle position to the ejecting position and allowing the ejecting finger to move into the ejected position.

18. The method according to claim 17, wherein the step of moving the ejecting finger from the idle position to the ejection position is performed prior to the step of releasing the gripped tire bead ring.

19. The method according to claim 18, wherein the step of moving the ejecting finger from the idle position to the ejection position is performed simultaneously with the step of releasing the gripped tire bead ring.

20. The method according to claim 16, the engaging finger of each engagement jaw includes a brake that is moveable between an idle position, in which the engaging finger is enabled to move between the remote position and the engaging position, and a braking position, in which the engaging finger is prevented from moving between the remote position and the engaging position, and wherein the step of moving the engaging fingers into the engaging position comprises, for each engagement jaw, moving a separating finger into the engaging position, thereby moving the associated engaging finger into the engaging position, and moving a brake into the braking position when the separating finger and the associated engaging finger are in the engaging position.

21. The method according to claim 20, further comprising, for each engagement jaw, moving the separating finger out of the engaging position towards the remote position when the brake of the associated engaging finger is moved into the braking position.

22. The method according to claim 20, wherein a spring is operatively connected to and provided between the engaging finger and the separating finger of each engagement jaw, and wherein the step of releasing the gripped tire bead ring by moving the engaging fingers towards the remote position comprises moving the brake into the idle position.

23. A bead transfer device for transferring a tire bead ring from a pick-up position to a placement position, the bead transfer device comprising:

a robotic arm and a gripper according to claim 1, which gripper is arranged at the robotic arm such that the robotic arm moves the gripper.

24. A computer-readable medium having computer-executable instructions adapted to cause a gripper to grip a tire bead ring, the gripper comprising:

two or more engagement jaws that are arranged at equal angular distance in a circumferential direction on the gripper, wherein each of the two or more engagement jaws is provided with an engaging finger for engaging the tire bead ring to be gripped, wherein the engagement jaws are configured to radially move in a movement direction between a remote position, in which the engaging fingers are remote from the tire bead ring to be gripped, and an engaging position, in which the engaging fingers engage the tire bead ring to be gripped, wherein the gripper is provided with an ejecting finger configured for ejecting a tire bead ring gripped by the gripper from the gripper to perform a method according to claim 16.

* * * * *